April 21, 1970     T. J. DYKZEUL     3,507,037
METHOD OF MAKING A THERMOSTAT TUBE ASSEMBLY
Original Filed Feb. 18, 1966
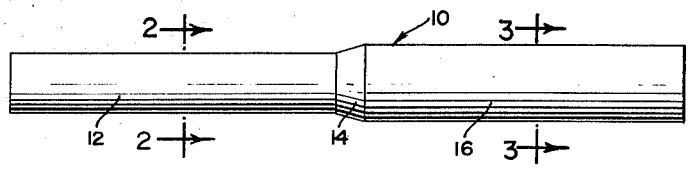
FIG. I
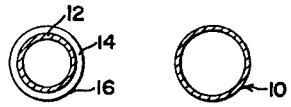
FIG. 2    FIG. 3
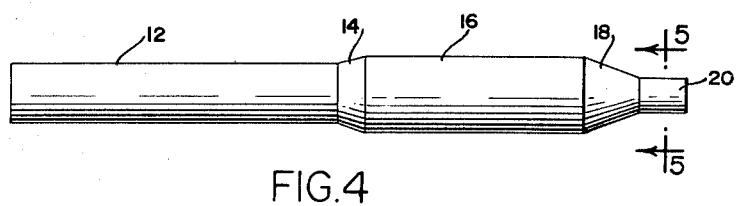
FIG. 4
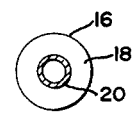
FIG. 5
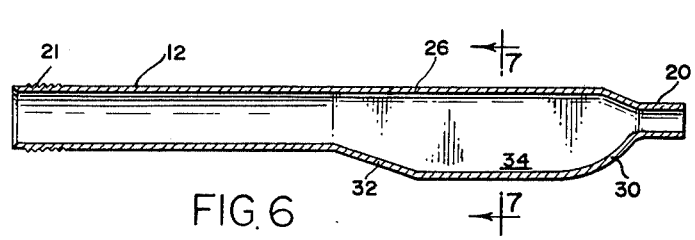
FIG. 6
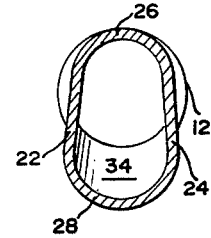
FIG. 7
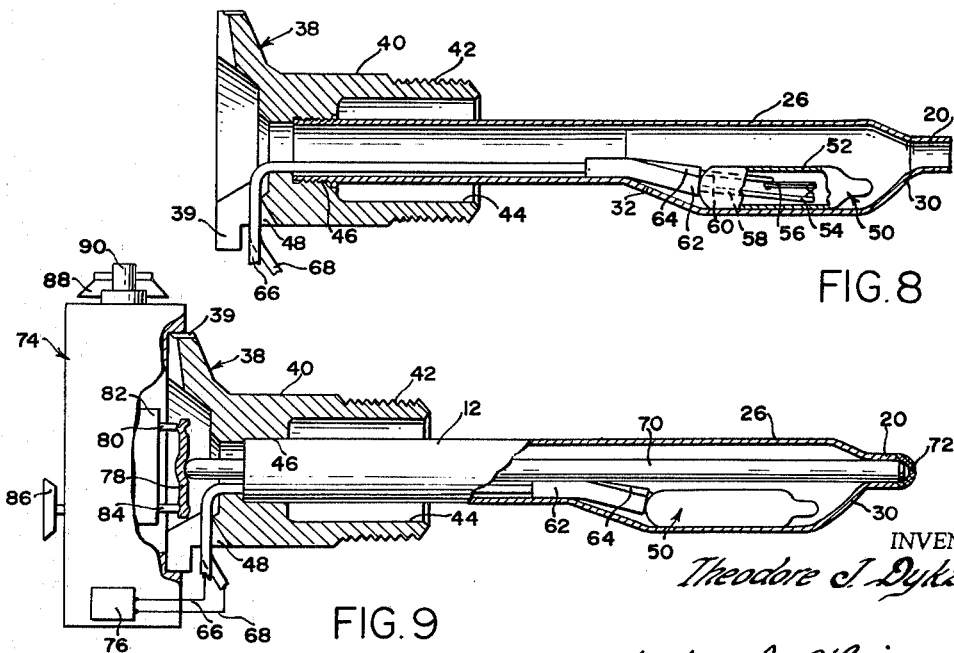
FIG. 8
FIG. 9
INVENTOR
Theodore J. Dykzeul
BY Anthony A. O'Brien
ATTORNEY United States Patent Office 3,507,037
Patented Apr. 21, 1970

3,507,037
METHOD OF MAKING A THERMOSTAT TUBE ASSEMBLY
Theodore J. Dykzeul, Rolling Hills, Calif., assignor to Robertshaw Controls Company, Richmond, Va., a corporation of Delaware
Continuation of application Ser. No. 528,542, Feb. 18, 1966. This application Apr. 16, 1968, Ser. No. 721,878
Int. Cl. H01h 11/00
U.S. Cl. 29—592    10 Claims

ABSTRACT OF THE DISCLOSURE

The process of assembling thermostat parts by forming a blank of thermally responsive material into a tube of two portions with an interior cavity formed in one of the portions whereby a second thermostat is assembled therein.

---

This application is a continuation of Ser. No. 528,542 filed Feb. 18, 1966.

This invention relates to a thermostat and the method of making the same, and in particular to a rod and tube type thermostat being formed to house a second thermostatic device.

A rod and tube type thermostat is well known in the art as comprising an outer tube of copper and an inner concenrtic rod of "Invar" whereby thermal expansion and contraction of the tube effects a corresponding axial movement of the rod to operate a control device between on and off positions in response to normal temperature conditions. Since it is also desirable to provide the control device with an abnormal temperature sensor, such sensor must be suitably located with respect to the normal temperature sensor so as to subject to the same temperature conditions.

Accordingly, it is an object of this invention to manufacture a dual thermostat assembly in a simple, economical manner.

Another object of this invention is to form the thermally responsive tube of a rod and tube thermostat by simple swaging and punching operations.

The present invention has another object in that the tube of a rod and tube thermostat unit is formed and extruded with a recess pocket intermediate its ends.

The present invention has another object in that the tube of a rod and tube thermostat unit is made with an integrally formed recess pocket to receive a second thermostatic means.

It is another object of this invention to provide the tube fo a rod and tube thermostat unit with an interior space along is longitudinal axis for receiving a switch assembly in parallel relationship to the tube axis.

A further object of the present invention is to provide a rod and tube thermostat unit with an integrally formed tube pocket housing a second thermostatic means so as not to interfere with movement of the rod.

In practicing the present invention, a blank of copper tubing is swaged intermediate its ends and on one end resulting in an enlarged intermediate portion that is impact extruded to form a space or recess which receives a second thermostatic means; a rod is disposed in the tube and joined at the swaged end to define a rod and tube thermostat with the rod movement being free of any hindrance of the second thermostatic means.

Other objects and advantages of the present invention will become apparent from the following description of a preferred embodiment taken in connection with the accompanying drawings wherein:

FIG. 1 is a plan view of a partially formed tube embodied in the present invention;

FIG. 2 is a cross section taken along line 2—2 of FIG. 1;

FIG. 3 is a cross section taken along line 3—3 of FIG. 1 and represents the shape of the blank from which the tube is to be formed;

FIG. 4 is a plan view of the tube of FIG. 1 in an intermediate step of its formation;

FIG. 5 is a cross section taken along line 5—5 of FIG. 4;

FIG. 6 is a longitudinal section of the tube of FIG. 4 in its next step of formation;

FIG. 7 is a twice enlarged cross section taken along line 7—7 of FIG. 6;

FIG. 8 is a partial longitudinal section of a dual thermostatic assembly embodying the present invention; and FIG. 9 is a side elevation view with parts in section of the dual thermostatic assembly in schematic relationship to a control device.

The tube of a rod and tube type thermostat is formed from a blank of drawn copper tubing in the shape and size of a hollow cylinder 10 generally shown on the right end of FIG. 1 and in FIG. 3. One end of the tube blank 10 is swaged to a smaller diameter as shown on the left end of FIG. 1 resulting in a left end portion 12 being reduced to a smaller diameter, an intermediate truncated conical portion 14 and a right end portion 16 which retains the same diameter as the original tube blank 10. Although the longitudinal dimensions of tube portions 12 and 16 are shown in FIG. 1 to be substantially equal, it is to be noted that different dimensions may be used; e.g., the tube portion 16 may be substantially longer than the tube portion 12 in order to meet the specific requirements of particular installations.

In its next step of forming, the tube of FIG. 1 is swaged on its right end which is reduced to a smaller diameter shown in FIG. 4. Thus the right end of tube portion 16 is joined with a truncated conical portion 18 leading to a short cylindrical end 20 that has a diameter smaller than the opposite end portion 12. The left end of tube portion 12 is internally chamfered and is externally threaded at 21 for mounting purposes as will be described hereinafter and the cylindrical end 20 is reamed and cut to the desired length dimension.

The partially formed machined tube of FIG. 4 is placed in a lower die (not shown) which supports the small end 20 and an interior mandrel (not shown) is inserted in the left end 12 to support the same. An inverted U-shaped, combined punch and die (not shown) is forced down over the large diameter tube portion 16. The upper and lower dies act in combination to extrude the tube downwardly as is illustrated in FIGS. 6 and 7, and the tube portion 16 is thus formed with flattened side walls 22 and 24 integral with rounded top and bottom walls 26 and 28, respectively. As a result of such impact extrusion, the top wall 26 is substantially aligned with the corresponding rounded part of the left end 12; a slight variation in alignment may exist because of the impact of the U-shaped die which has a length equal to the length of the tube portions 14, 16 and 18 of FIG. 4. The truncated conical portions 14 and 18 are also deformed during the impact extrusion. The portion 18 results in partially flattened side walls, a rounded top wall and an arcuate bottom wall 30, with all such walls decreasing in cross section to the small end 20. The portion 14 results in a rounded top wall of substantially the same radius of curvature as the rounded top wall 26 to blend uniformly with the left end 12; the side walls of portion 14 are substantially flattened and its bottom wall 32 defines a slanted wall between the left end 12 and the rounded bottom wall 28.

The impact extrusion does not alter the longitudinal axis of the formed tube because the right end 20 is supported on the lower die and the left end 12 is supported by the interior mandrel. The lower die is also provided with a recess so that the bottom wall 28 may be formed without restraint. It is now apparent that rounded bottom wall 28 and the flattened side walls 22 and 24 define an intermediate recess or pocket 34 in the formed tube for a purpose to be described hereinafter.

An assembly unit for the formed tube includes a mounting shank, indicated generally at 38, having mounting flanges 39 and a bored extension 40 which is threaded on its end 42 for fastening to the wall of any suitable apparatus, such as heating apparatus (not shown). The through bore of shank 38 is stepped as by counterboring to define an outer recess 44 and an intermediate threaded recess 46 receiving the threaded end 21 whereby the formed tube is attached to the shank 38. The flanged end of shank 38 has a bottom slot 48 to receive terminal leads of a switch 50.

As is shown in FIG. 8, the switch 50 includes a casing 52 of suitable material, such as glass, housing a fixed contact means 54 and movable contact means 56 on a bimetallic element so as to flex toward and away from the fixed contact 54. The contacts 54 and 56 are integrated with sealed-in terminal leads 58 and 60, respectively, which are provided with covers 62 and 64, respectively, of insulating material, and which are part of the lead wires 66 and 68, respectively. A rod 70 (FIG. 9) of "Invar," material is concentrically disposed in the tube 26 and is of such diameter as to fit snugly within the tube end 20; the adjacent ends of the rod 70 and the tube end 20 are then integrated or bonded as by a heliarc weld 72. The switch leads 66 and 68 straddle the rod 70 so as not to bias or inpede rod movement. The free end of rod 70 terminates in the flanged portion of mounting shank 38 which is fastened as by screws (not shown) to a wall of a control device, indicated generally at 74.

The control device 74 may be of any suitable type such as an electric or gas control, for controlling the flow of energy to heating apparatus in response to normal temperature conditions and to cut-off the flow of energy in response to an abnormal temperature condition. The abnormal temperature control 76 is connected to the lead wires 66 and 68 which extend through the slot opening 48 in the shank 38 so that the control 76 is actuated to a cut-off of the flow of energy in response to an abnormally high temperature condition as sensed by the bimetallic element 56 in the switch 50.

As is illustrated in FIG. 9, the free end of rod 70 engages one side of a lever 78 intermediate its ends; on its opposite side, one end of lever 78 engages an actuating button 80 which operates the normal temperature control 82 while the other end of lever 78 engages a shaft 84 which is axially adjusted by means of a dial knob 86 to a desired temperature setting. The control device 74 may also include a manual on-off control knob 88 as well as a reset mechanism 90 which is manually operated to reset the abnormal control 76 after it has cut-off the flow of energy. For a more complete description of the details of the control device 74, reference is made to U.S. Patent No. 2,880,936.

Operation of the device in FIG. 9 is commenced by moving the manual on-off knob 88 to an on position and moving dial knob 86 to a desired temperature setting for normal temperature conditions; the thermostatic switch 50 is calibrated before assembly to respond to a predetermined abnormal temperature condition. Since the rod 70 is secured to the tube end 20, the rod will move axially in response to thermal expansion and contraction of the copper tube. Thus during a temperature rise as sensed by the tube, the tube will expand axially to the right as viewed in FIG. 9 and the rod 70 will follow such movement; when the set temperature is reached, the lever 78 will have been pivoted clockwise to a sufficient distance to cause actuation of the control device operator 80. Should the temperature continue to rise due to some malfunction, the bimetal 56 will actuate the switch 50 causing operation of the safety device 76. The control device 74 is now shut off and must be reset by depression of the plunger 90 to initiate further operation of the heating apparatus.

With the above arrangement of the dual thermostat assembly, both thermally responsive devices are incorporated into a single mounting which facilitates shipment to the apparatus manufacturer and installation without the need of skilled mechanics. The entire simplicity of the assembly results in advantages inspection, adjustment or replacement.

Inasmuch as the present invention is subject to many modifications, changes in details and reversal of parts, it is intended that all matter contained in the foregoing description or shown on the accompanying drawing shall be interpreted as illustrative and not in a limiting sense.

What is claimed is:

1. The method of making a thermally responsive tube assembly for a thermostat comprising the steps of,
    forming a blank of thermally responsive material into a tube of two portions with one portion having a smaller diameter than the other portion,
    reducing said other portion adjacent its end to form a small end having a diameter smaller than said one portion,
    deforming said other portion to form an interior cavity laterally offset to one side of a longitudinal axis defined by said small end and said one portion, and
    inserting a thermostatic switch in said interior cavity with terminal leads of said switch extending out of the end of said one portion.

2. The invention as recited in claim 1 wherein the deforming step is accomplished by extruding the said other portion.

3. The invention as recited in claim 1 wherein the forming step is accomplished by swaging.

4. The invention as recited in claim 1 including the step of threading said one portion of said tube on its end whereby the tube may be fastened to mounting shank means.

5. The method of making a thermally responsive tube assembly for a thermostat comprising the steps of,
    forming a blank of thermally responsive material into a tube of two portions with one portion having a smaller diameter than the other portion,
    reducing said other portion adjacent its end to form a small end having a diameter smaller than said one portion,
    deforming said other portion to form an interior cavity laterally offset to one side of a longitudinal axis defined by said small end and said one portion,
    threading said one portion of said tube on its end whereby the tube may be fastened to mounting means, and
    inserting a thermostatic switch in said interior cavity with terminal leads of said switch extending out of the end of said one portion.

6. The invention as recited in claim 5 wherein a rod of relatively non-thermally responsive material is axially disposed in said tube with one end being joined to the small end of said tube.

7. The invention as recited in claim 6 wherein the joining step comprises welding the small end of said tube to the rod end.

8. The method of making a thermally responsive tube assembly for a thermostat comprising the steps of,
    forming a blank of thermally responsive material into a tube defining two longitudinal portions,
    deforming one of said portions to form an interior cavity laterally offset to one side of a longitudinal axis defined by the other of said portions,
    inserting a thermostatic switch in said interior cavity, and positioning a rod of non-thermally responsive material coaxially in said tube with one end of said rod being joined to an adjacent end of said tube whereby said rod follows movement of said tube during thermal expansion and contraction.

9. The invention as recited in claim 8 wherein said forming step is accomplished by swaging.

10. The invention as recited in claim 8 wherein said deforming step is accomplished by extruding the said one portion.

References Cited

UNITED STATES PATENTS

| | | |
|---|---|---|
| 1,152,858 | 9/1915 | Stewart. |
| 1,486,280 | 3/1924 | Carlson _____ 29—156 |
| 1,951,654 | 3/1934 | Green _____ 29—629 XR |
| 2,618,722 | 11/1952 | De Witt _____ 73—362.3 XR |
| 3,037,551 | 6/1962 | Fairbanks _____ 158—42.3 XR |
| 3,079,480 | 2/1963 | Loveland _____ 73—362.3 XR |
| 3,320,388 | 5/1967 | Kreuter _____ 200—137 |
| 2,170,853 | 8/1939 | Cornell. |
| 2,500,890 | 3/1950 | Wurzburger. |
| 2,837,810 | 6/1958 | Ekholm. |
| 3,099,880 | 8/1963 | Huet. |

FOREIGN PATENTS 20,851    1903    Great Britain.

JOHN F. CAMPBELL, Primary Examiner

R. W. CHURCH, Assistant Examiner

U.S. Cl. X.R.

29—622, 157; 73—363.5; 236—21